UNITED STATES PATENT OFFICE.

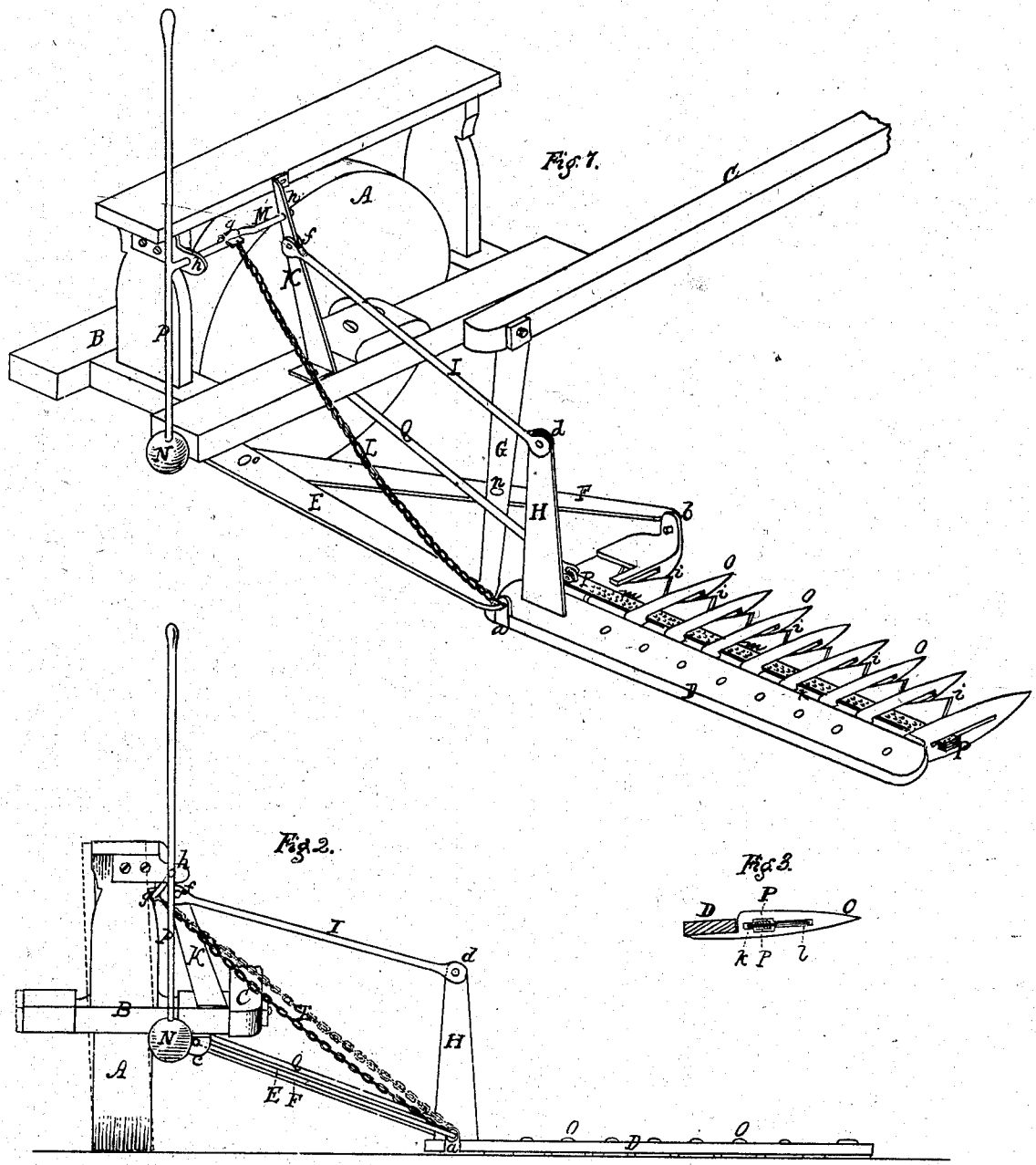

FRANKLIN EWER, OF MENDON CENTER, NEW YORK.

IMPROVEMENT IN HARVESTERS.

Specification forming part of Letters Patent No. 39,804, dated September 8, 1863; antedated January 3, 1863.

*To all whom it may concern:*

Be it known that I, FRANKLIN EWER, of Mendon Center, in the county of Monroe and State of New York, have invented certain new and useful Improvements in Harvesters; and I do hereby declare that the following is a full and exact description thereof, reference being had to the accompanying drawings, making part of this specification—

Figure 1 being a perspective view of my improved harvester; Fig. 2, a rear elevation thereof; Fig. 3, a cross-section of the finger-beam and cutters.

Like letters designate corresponding parts in all the figures.

My improvements are designed more particularly to be used with a machine for cutting grass, having but a single driving and supporting wheel; and the invention consists, first, in connecting the finger-beam with the frame of the machine by an arrangement of double-jointed coupling-bars and braces, whereby the former is allowed a free action in adapting itself to the surface of the ground, and is at the same time strongly and firmly braced; second, in the use of a chain or flexible connection between the inner end of the finger-beam and a crank secured to the frame, having at one end a vertical rod, to which is secured a pendulum-weight, by which means, when going on a hillside or over inclined ground, the machine is prevented from tipping over, while at the same time the chain does not interfere with the action of the finger-beam; and, third, in the arrangement of the cutting device, whereby the same is prevented from being choked or clogged by grass or other substance.

I use an ordinary driving and supporting-wheel, A, to which is secured, in the usual manner, a frame, B, having a shaft or tongue, C, for attaching the horses to. With this frame the finger-beam D is connected as follows: On the rear side of the inner end of the finger-beam is secured a socket-bearing, *a*, and the forward end of the inner shoe is formed with a similar bearing, *b*. These bearings are on the line of motion of the machine when in use. In the rear bearing rests the joint end of a coupling-bar, D, extending inward and obliquely backward, and jointed to the frame of the machine in any suitable manner, as represented at *c*, Fig. 2. From the end of this bar next the finger-beam extends another brace coupling-bar, G, obliquely forward, as shown, the other end being jointed at a suitable position in front to the frame on the same line of motion with the joint *c*. In a forward bearing, *b*, fits the joint end of a similar coupling-bar, F, extending backward obliquely across the bar G, to which it is riveted or otherwise fastened at *n*, and is finally secured in a similar manner to the inner end of the bar E, as represented at *o*. Thus arranged, the finger-beam has a free action to adapt itself to the inclination or inequality of the surface of the ground, as in any other double-jointed coupling arrangement, with the advantage of being more strongly and firmly braced. The bar E, by extending obliquely backward to the rear of the frame, acts as a stiff brace against any back-pressure of the finger-beam, and the bar G, by extending forward to the front of the frame, acts as a brace in the opposite direction against the same movement, while the bar F, being attached to the front of the finger-beam and firmly connected with both the other bars, serves to stiffen them and to keep the finger-beam in place. The inner ends of the bars E and G, by being jointed to the frame at considerable distance apart, furnish a strong leverage against any back movement of the finger-beam. The whole acts as a firm brace, and the finger-beam cannot become disarranged or out of place by any ordinary obstruction. By this arrangement great strength is obtained in proportion to the amount of material used, enabling the machine to be made unusually light.

To the inner end of the finger-beam is secured an upright standard or arm, H, of suitable height and size for the purpose designed, to the upper end of which is jointed or pivoted, at *d*, a connecting-rod, I, extending inward, and similarly jointed at *f* to a bearing, K, secured conveniently to the frame or in some equivalent manner. This connecting-rod is on the same line or plane with the vertical turning motion of the finger-beam, so as not to interfere with the free action of the latter as it accommodates itself to the surface of the ground, and its length is such as to always keep the driving-wheel and frame in a perpendicular position relatively to the finger-beam—that is, the upright plane of the former at right angles with the plane of the latter. Thus the finger-beam governs the position of the driving-wheel and frame. If the machine is running on level ground, the finger-beam will be in a horizontal position and the driving-wheel and frame in a vertical one, as represented in the drawings. If the finger-beam inclines either to the right or left on a hillside or otherwise, the driving-wheel and frame will assume a correspondingly-inclined position relating thereto. The advantage of this arrangement in connection with a mowing-machine having but a single driving-wheel is at once apparent. Where the finger-beam is connected with the frame by a double-jointed connection, as described, there must be something to sustain the driving-wheel in an upright position, as it will not support itself in passing over inclined ground, and the driving-wheel must preserve with the finger-beam always the same angle; otherwise the gearing will be disarranged, the pitman Q will not work, but will be bent and broken, and the cutter-bars and cutters will be drawn or forced out of their place. By connecting the inner end of the finger-beam with the frame, as I have above described, I accomplish the result desired in a most perfect manner, while the arrangement is very cheap and not liable to disarrangement, and it does not interfere in the least with the free action of the finger-beam.

In passing over the side of a hill or steep inclination with the outer end of the finger-bar elevated, and consequently with the driving-wheel correspondingly inclined, the liability of the machine to overturn is increased from the finger-beam turning on the joints $a$ and $b$, and the drawing of the weight of the driving-wheel and frame on the connecting-rod I thus having a tendency to turn the said finger-beam up or elevate it on its inner end while the wheel and frame turn over. I remedy this difficulty in the following manner: To the inner end of the finger-beam I attach a chain or other flexible connection, L, extending thence upward and inward, and fastened to the crank $g$ of a shaft, M, situated longitudinally of the machine, to the frame of which it is secured in suitable bearings, $h$. The position of the crank is usually inclined away from the finger-beam, as represented in Fig. 2. The rear end of the crank-shaft is provided with a vertical rod or arm, $p$, extending downward a suitable distance for the purpose designed, and having on its end a pendulum-weight, N, of sufficient gravity to produce the proper effect. The arm $p$ may be extended above the end of the shaft, forming thereby a lever to operate the crank by hand, when it is desirable to do so. The length of the chain L is such that when the machine works on level ground it shall be slack, as represented, and this slackness is just sufficient to give the proper play to the finger-beam in passing over inequalities of the ground.

In passing over a hillside with the outer end of the finger-beam elevated and with the driving-wheel inclined, as represented in red lines, Fig. 2, the tendency of the pendulum-weight is to always keep its rod in a vertical position, and consequently the crank $g$ is thrown outward or to one side, thereby taking up the slack of the chain L and drawing through it on the end of the finger-bar. Thus the weight of the driving-wheel and its frame, drawing sidewise when thus inclined, instead of acting entirely on the connecting-rod I and having a tendency to tip the finger-beam up on its end, acts equally on the chain L, by which means the finger-beam is retained in an extended position, forming a rigid connection of the whole machine, and if the machine is overturned it must be in that condition. The chain, by being flexible, also allows the inner end of the finger-beam to rise over any inequality or obstruction by slackening, which would not be the case if it were a stiff rod. It also prevents the inner end of the finger-beam from dropping too low in a furrow, hole, or depression, and consequently giving too great an angle to the pitman-rod and causing great strain and friction to the parts.

The guard-fingers O O O, in which the cutters work, are made entire or of single pieces of metal, and attached to the finger-bar by rivets or in any suitable manner. The cutting arrangement is formed as follows: The knives $i$ $i$ $i$, instead of being secured to a single bar sliding in a guideway in the usual manner, are secured between two cutter-bars, P P, the rear ends or edges of said knives projecting back a sufficient distance, as represented at $k$, Fig. 3, to form a bearing the whole length of the cutter-bars, sliding in a corresponding guideway in the fingers. The front portions of the knives, forward of the cutter-bars, likewise rest in a corresponding guideway in the fingers, as shown at $l$, while the cutter-bars themselves slide in an enlarged passage in such a manner that their surfaces shall not come in contact with the fingers. Thus the knives themselves form the guides, instead of the cutter-bars, as usual. The upper and lower surfaces of the cutter-bars are rasped, roughened, or provided with projecting points, as represented at $m$, Fig. 1, the rasps usually pointing toward the driving-wheel. The use of these rasps or points is to keep the fingers clear of choking or becoming obstructed by cut grass and other substances by constantly drawing it out of the passages in the fingers. The cutter-bars, by sliding free of the fingers, are prevented from becoming worn or having the rasps injured.

I am aware that double-jointed coupling-bars for connecting the finger-beam with the frame of a harvester have before been used, and therefore I do not claim such, broadly. Neither do I claim broadly the use of a rasped or roughened surface for clearing the cutting apparatus from choking; but

What I claim as my invention, and desire to secure by Letters Patent, is—

1. Connecting the finger-beam with the frame by means of the oblique coupling and brace-bars E, G, and F, jointed both to the said finger-beam and frame, thereby allowing a free movement of the former, and at the same time so connected together and braced as to resist any strain, the whole arranged, combined, and operating substantially as herein set forth.

2. In combination with the frame and finger-beam, the chain L or its equivalent, the crank $g$, rod $p$, and pendulum-weight N, arranged substantially as and for the purpose specified.

3. The cutter-bars P P, rasped, roughened, or provided with pointers on their outer surfaces, and having secured between them the knives $i$ $i$ $i$, the latter projecting in the rear thereof as well as in the front, and forming the guide in the guard-fingers, while the cutter-bars slide free from contact and clear the fingers from choking, substantially as herein set forth.

In witness whereof I have hereunto signed my name in the presence of two subscribing witnesses.

FRANKLIN EWER.

Witnesses:
R. F. OSGOOD,
D. C. JOHNSON.